US006456668B1

United States Patent
MacLellan et al.

(10) Patent No.: US 6,456,668 B1
(45) Date of Patent: *Sep. 24, 2002

(54) QPSK MODULATED BACKSCATTER SYSTEM

(75) Inventors: John Austin MacLellan, Freehold; R. Anthony Shober, Red Bank; Giovanni Vannucci, Township of Middletown, Monmouth County; Gregory Alan Wright, Colts Neck, all of NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/775,694

(22) Filed: Dec. 31, 1996

(51) Int. Cl.[7] .............................................. H04L 27/10
(52) U.S. Cl. ........................ 375/283; 455/73; 455/106; 340/572.1; 340/505
(58) Field of Search ................................ 375/215, 219, 375/220, 222, 268, 269, 272, 233, 279, 282, 283; 455/73, 106, 517, 572.1; 340/825.59; 342/51; 370/276, 278

(56) References Cited

U.S. PATENT DOCUMENTS

| | | |
|---|---|---|
| 3,720,940 A | 3/1973 | Fox et al. |
| 3,944,928 A | 3/1976 | Augenblick et al. |
| 3,984,835 A | 10/1976 | Kaplan et al. |
| 4,068,232 A | 1/1978 | Meyeres et al. |
| 4,075,632 A | 2/1978 | Baldwin et al. |
| 4,360,810 A | 11/1982 | Landt |
| 4,471,345 A | 9/1984 | Barrett, Jr. |
| 4,510,495 A | 4/1985 | Sigrimis et al. |
| 4,584,534 A | 4/1986 | Lijphart et al. |

(List continued on next page.)

FOREIGN PATENT DOCUMENTS

| | | |
|---|---|---|
| EP | 0 313 491 A1 | 4/1989 |
| EP | 0 346 922 A2 | 12/1989 |
| EP | 0 520 445 A2 | 12/1992 |
| EP | 0 670 558 A2 | 2/1995 |

(List continued on next page.)

OTHER PUBLICATIONS

"A Microwave Noncontact Identification Transponder Using Subharmonic Interrogation," Carol W. Pobanz, 8099 IEEE Transactions on Microwave Theroy and Techniques, 43 (1995), Jul., No. 7, PT. II, New York, US, pp. 1673–1679.
"A Coded Radar Reflector For Remote Identification Of Personnel And Vehicles," Frank R. Williamson, Lacey F. Moore, Ralph Brooks, Julie Anne Williamson, and Melvin C. McGee, Record of the 1993 IEEE National Radar Conference, Lynnfield, MA, USA, Apr. 20–22, 1993, ISBN 0–7803–0934–0, pp. 186–191.

Primary Examiner—William G. Trost
Assistant Examiner—Congvan Tran
(74) Attorney, Agent, or Firm—Christopher N. Malvon; Irena Lager

(57) ABSTRACT

In accordance with the present invention, a duplex radio communication system comprises an Interrogator which generates a radio signal to at least one remote Tag. The remote Tag receives the radio signal. The Tag then generates a subcarrier signal, and using Quadrature Phase Shift Keying (QPSK), modulates an information signal onto the subcarrier. A Backscatter Modulator, using this modulated subcarrier, modulates the reflection of the radio signal, the reflected signal being a reflected modulated signal. The Interrogator receives and demodulates the reflected modulated signal to obtain the information signal. In one embodiment, demodulation utilizes a homodyne detector. In another embodiment, the Interrogator modulates an information signal onto the radio signal, transmits that modulated radio signal to the Tag, and the Tag demodulates that modulated radio signal to recover the information signal. In another embodiment, higher order phase modulations are used to modulate an information signal onto the subcarrier.

10 Claims, 5 Drawing Sheets

U.S. PATENT DOCUMENTS

| | | | |
|---|---|---|---|
| 4,641,374 A | | 2/1987 | Oyama |
| 4,656,463 A | | 4/1987 | Anders et al. |
| 4,691,202 A | | 9/1987 | Denne et al. |
| 4,737,789 A | | 4/1988 | Nysen ......................... 936/892 |
| 4,739,328 A | | 4/1988 | Koelle et al. |
| 4,816,769 A | * | 3/1989 | Ma et al. ...................... 329/50 |
| 4,816,839 A | | 3/1989 | Landt |
| 4,827,395 A | | 5/1989 | Anders et al. |
| 4,888,591 A | | 12/1989 | Landt et al. |
| 4,912,471 A | | 3/1990 | Tyburski et al. |
| 4,937,581 A | | 6/1990 | Baldwin et al. |
| 4,963,887 A | | 10/1990 | Kawashima et al. |
| 4,993,068 A | | 2/1991 | Piosenka et al. |
| 5,030,807 A | | 7/1991 | Landt et al. |
| 5,039,994 A | | 8/1991 | Wash et al. |
| 5,055,659 A | | 10/1991 | Hendrick et al. |
| 5,086,391 A | | 2/1992 | Chambers |
| 5,131,038 A | | 7/1992 | Puhl et al. |
| 5,153,919 A | | 10/1992 | Reeds |
| 5,164,985 A | | 11/1992 | Nysen et al. |
| 5,214,409 A | | 5/1993 | Beigel |
| 5,214,410 A | | 5/1993 | Verster |
| 5,227,803 A | | 7/1993 | O'Connor et al. |
| 5,251,218 A | | 10/1993 | Stone et al. |
| 5,252,979 A | | 10/1993 | Nysen |
| 5,264,854 A | | 11/1993 | Spiess |
| 5,305,008 A | | 4/1994 | Turner et al. |
| 5,305,459 A | | 4/1994 | Rydel |
| 5,339,073 A | | 8/1994 | Dodd et al. |
| 5,347,263 A | | 9/1994 | Carroll et al. |
| 5,353,301 A | * | 10/1994 | Mitzlaff ...................... 375/200 |
| 5,381,137 A | | 1/1995 | Ghaem et al. |
| 5,390,339 A | | 2/1995 | Bruckert et al. |
| 5,400,949 A | | 3/1995 | Hirvonen et al. |
| 5,410,315 A | | 4/1995 | Huber ......................... 986/950 |
| 5,420,757 A | | 5/1995 | Eberhardt et al. |
| 5,423,056 A | | 6/1995 | Linquist et al. |
| 5,425,032 A | | 6/1995 | Shloss et al. ................. 194/674 |
| 5,426,667 A | | 6/1995 | van Zon |
| 5,434,572 A | | 7/1995 | Smith |
| 5,438,329 A | | 8/1995 | Gastouniotis et al. ......... 72/241 |
| 5,448,110 A | | 9/1995 | Tuttle et al. |
| 5,448,242 A | | 9/1995 | Sharpe et al. |
| 5,455,575 A | | 10/1995 | Schuermann |
| 5,461,385 A | | 10/1995 | Armstrong |
| 5,463,402 A | | 10/1995 | Walrath et al. |
| 5,477,215 A | | 12/1995 | Mandelbaum |
| 5,478,991 A | | 12/1995 | Watanabe et al. |
| 5,479,160 A | | 12/1995 | Koelle |
| 5,479,416 A | | 12/1995 | Snodgrass et al. |
| 5,485,520 A | | 1/1996 | Chaum et al. |
| 5,491,484 A | | 2/1996 | Schuermann |
| 5,510,795 A | | 4/1996 | Koelle |
| 5,521,944 A | | 5/1996 | Hegeler et al. |
| 5,523,749 A | | 6/1996 | Cole et al. |
| 5,525,993 A | | 6/1996 | Pobanz et al. |
| 5,525,994 A | | 6/1996 | Hurta et al. |
| 5,530,202 A | | 6/1996 | Dais et al. |
| 5,543,798 A | | 8/1996 | Schuermann |
| 5,559,828 A | * | 9/1996 | Armstrong et al. ......... 375/200 |
| 5,565,858 A | | 10/1996 | Guthrie |
| 5,572,222 A | | 11/1996 | Mailandt et al. |
| 5,581,576 A | | 12/1996 | Lanzetta et al. |
| 5,600,538 A | | 2/1997 | Xanthopoulos |
| 5,610,939 A | * | 3/1997 | Takahashi et al. .......... 375/206 |
| 5,633,613 A | | 5/1997 | MacDonald |
| 5,640,683 A | | 6/1997 | Evans et al. |
| 5,649,295 A | * | 7/1997 | Shober et al. ............. 455/38.2 |
| 5,649,296 A | | 7/1997 | Maclellan et al. |
| 5,686,928 A | | 11/1997 | Pritchett et al. |
| 5,708,444 A | | 1/1998 | Pouwels et al. |
| 5,727,027 A | * | 3/1998 | Tsuda .......................... 375/329 |
| 5,760,653 A | * | 6/1998 | Soda .......................... 331/1 A |
| 5,774,673 A | | 6/1998 | Beuk et al. .................. 673/882 |
| 5,774,876 A | | 6/1998 | Woolley et al. |
| 5,796,827 A | | 8/1998 | Coppersmith et al. ...... 749/865 |
| 5,804,810 A | | 9/1998 | Wolley et al. |
| 5,850,187 A | | 12/1998 | Carrender et al. |
| 5,852,403 A | | 12/1998 | Boardman ................... 358/357 |
| 5,872,516 A | | 2/1999 | Bonge, Jr. et al. ........... 199/614 |
| 5,873,025 A | | 2/1999 | Evans et al. ................. 877/597 |
| 5,874,903 A | | 2/1999 | Shuey et al. ................. 870/640 |
| 5,929,779 A | | 7/1999 | MacLellan et al. |
| 5,940,006 A | | 8/1999 | MacLellan et al. |
| 5,943,378 A | * | 8/1999 | Keba et al. .................. 375/373 |
| 5,952,922 A | | 9/1999 | Shober ........................ 775/701 |
| 6,023,610 A | * | 2/2000 | Wood et al. ................. 455/101 |

FOREIGN PATENT DOCUMENTS

| | | |
|---|---|---|
| EP | 0 724 351 A2 | 7/1996 |
| EP | 0 732 597 A1 | 9/1996 |
| EP | 0 750 200 | 12/1996 |
| EP | 0 750 201 A1 | 12/1996 |
| EP | 0779 520 A2 | 12/1996 |
| GB | 1 098 431 | 11/1982 |
| GB | 2 193 359 | 2/1988 |
| GB | 2 202 415 | 9/1988 |
| JP | S63-52082 | 3/1988 |
| WO | WO 89/05549 | 6/1989 |
| WO | WO 94/19781 | 9/1994 |

* cited by examiner

QPSK MODULATED BACKSCATTER SYSTEM

RELATED APPLICATIONS

Related subject matter is disclosed in the following application filed concurrently herewith and assigned to the same Assignee hereof: U.S. patent applications "Shielding Technology In Modulated Backscatter System", Ser. No. 08/777,770; "Encryption for Modulated Backscatter Systems", Ser. No. 08/777,832; "Antenna Array In An RDID System", Ser. No. 08/775,217; "Modulated Backscatter Location System", Ser. No. 08/777,643; "Modulated Backscatter Sensor System", Ser. No. 08/777,771; "Subcarrier Frequency Division Multiplexing Of Modulated Backscatter Signals", Ser. No. 08/777,834; "IQ Combiner Technology In Modulated Backscatter System", Ser. No. 08/775,695; "In-Building Personal Pager And Identifier", Ser. No. 08/775,738; "In-Building Modulated Backscatter System", Ser. No. 775,701; "Inexpensive Modulated Backscatter Reflector", Ser. No. 08/774,499; "Passenger, Baggage, And Cargo Reconciliation System", Ser. No. 08/782,026. Related subject matter is also disclosed in the following applications assigned to the same assignee hereof: U.S. patent application Ser. No. 08/504188, entitled "Modulated Backscatter Communications System Having An Extended Range"; U.S. patent application Ser. No. 08/492,173, entitled "Dual Mode Modulated Backscatter System"; U.S. patent application Ser. No. 08/492,174, entitled "Full Duplex Modulated Backscatter System"; and U.S. patent application Ser. No. 08/571,004, entitled "Enhanced Uplink Modulated Backscatter System".

BACKGROUND OF THE INVENTION

1. Field of the Invention

This invention relates to wireless communication systems and, more particularly, to a wireless communication system using modulated backscatter technology.

2. Description of the Related Art

Radio Frequency IDentification (RFID) systems are used for identification and/or tracking of equipment, inventory, or living things. RFID systems are radio communication systems that communicate between a radio transceiver, called an Interrogator, and a number of inexpensive devices called Tags or transponders. In RFID systems, the Interrogator communicates to the Tags using modulated radio signals, and the Tags respond with modulated radio signals. The Interrogator first transmits an amplitude modulated signal to the Tag. Then, the Interrogator transmits a Continuous-Wave (CW) radio signal to the Tag. The Tag then modulates the CW signal using Modulated BackScattering (MBS) where the antenna is electrically switched, by the Tag's modulating signal, from being an absorber of RF radiation to being a reflector of RF radiation; thereby encoding the Tag's information onto the CW radio signal. The Interrogator demodulates the incoming modulated radio signal and decodes the Tag's information message.

MBS systems typically utilize amplitude modulated techniques for communications from the Interrogator to the Tag. For Tag to Interrogator MBS communications, prior art maintains the use of Frequency Shift Keying modulation techniques. Prior art also maintains baseband homodyne detection of the MBS signal at the interrogator; however baseband homodyne detection suffers from oscillator phase noise, large DC offsets, and mixer noise.

SUMMARY OF THE INVENTION

In an embodiment of this invention, we disclose techniques for utilizing Quadrature Phase Shift Keying (QPSK) in an MBS system; we also disclose techniques for extending QPSK to higher orders of phase modulation.

In accordance with an embodiment of the present invention, a duplex radio communication system comprises an Interrogator which generates a radio signal to at least one remote Tag. The remote Tag receives the radio signal. The Tag then generates a subcarrier signal, and using Quadrature Phase Shift Keying (QPSK), modulates an information signal onto the subcarrier. A Backscatter Modulator, using this modulated subcarrier, modulates the reflection of the radio signal, the reflected signal being a reflected modulated signal. The Interrogator receives and demodulates the reflected modulated signal to obtain the information signal. In one embodiment, demodulation utilizes a homodyne detector. In another embodiment, the Interrogator modulates an information signal onto the radio signal, transmits that modulated radio signal to the Tag, and the Tag demodulates that modulated radio signal to recover the information signal. In another embodiment, higher order phase modulations are used to modulate an information signal onto the subcarrier.

DETAILED DESCRIPTION

One class of RFID applications involves using RFID technology to read information from a Tag affixed to a container or pallet. In this application, the container is moved across the reading field of an Interrogator. The reading field is defined as that volume of space within which a successful communication can take place. While the Tag is in the reading field, the Interrogator and Tag must complete their information exchange before the Tag moves out of the field. Since the Tag is moving through the reading field, the RFID system has only a limited amount of time to successfully complete the transaction.

Figure 1:
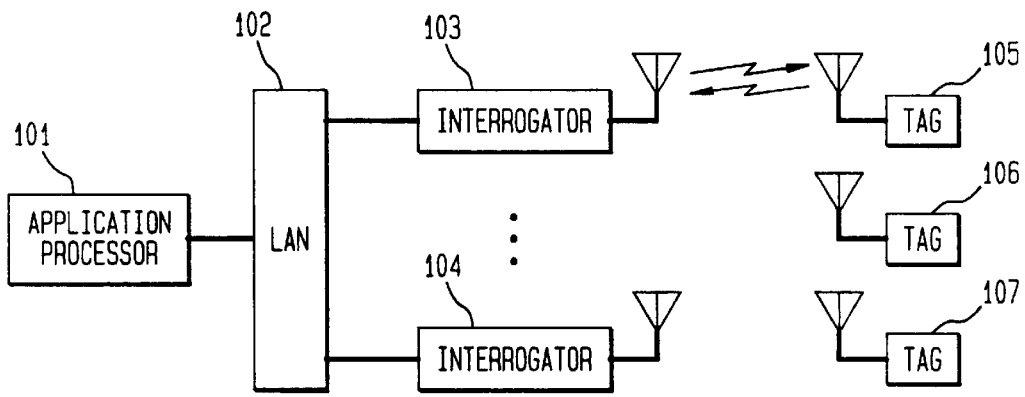
FIG. 1 shows a block diagram of an illustrative Radio Frequency Identification (RFID) system.
Figure 2:
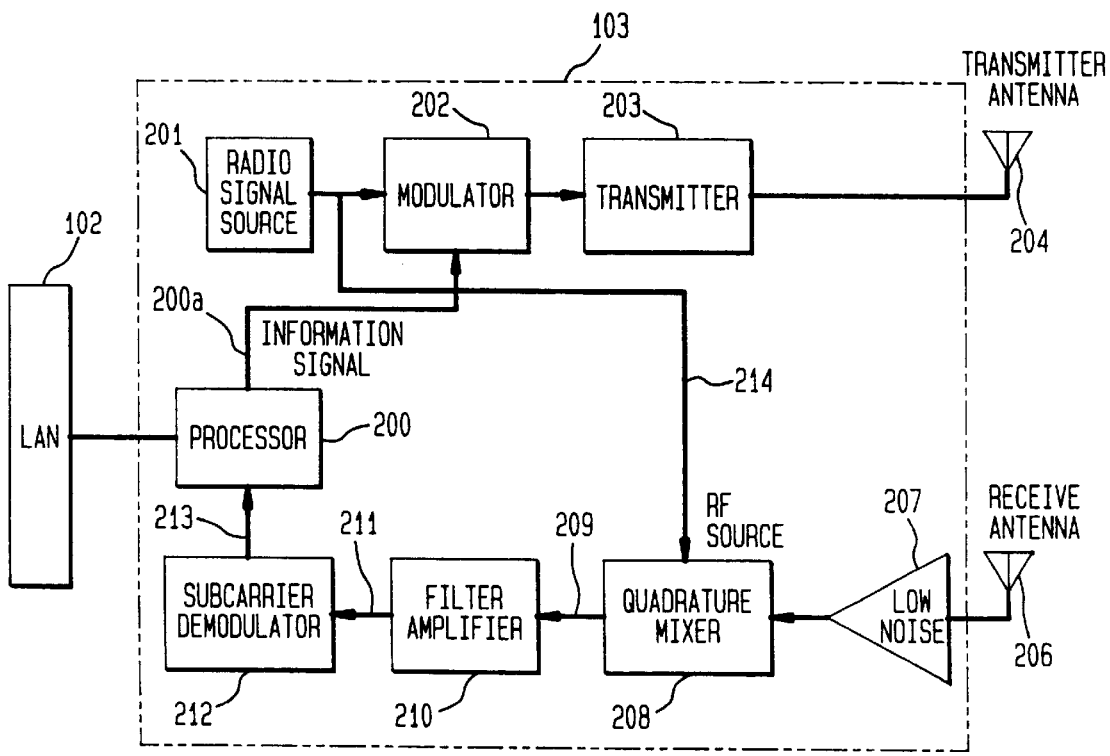
FIG. 2 shows a block diagram of an illustrative Interrogator Unit used in the RFID system of FIG. 1.

With reference to FIG. 1, there is shown an overall block diagram of an illustrative RFID system useful for describing the application of the present invention. An Application Processor 101 communicates over Local Area Network (LAN) 102 to a plurality of Interrogators 103–14 104. The Interrogators may then each communicate with one or more of the Tags 105–107. For example, the Interrogator 103 receives an information signal, typically from an Application Processor 101. The Interrogator 103 takes this information signal and Processor 200 (FIG. 2) properly formats a downlink message (Information Signal 200a) to be sent to the Tag. The information signal (200a) includes information such as information specifying which Tag is to respond (each Tag may have fixed or programmed identification number), instructions for the Tag's processor to execute or other information to be used and/or stored by the Tag's processor. With joint reference to FIGS. 1 and 2, Radio Signal Source 201 generates a radio signal, the Modulator 202 modulates the Information Signal 200a onto the radio signal, and the Transmitter 203 sends this modulated signal via Antenna 204, illustratively using amplitude modulation, to a Tag. Amplitude modulation is a common choice since the Tag can demodulate such a signal with a single, inexpensive nonlinear device (such as a diode).

In the Tag 105 (see FIG. 3), the Antenna 301 (frequently a loop or patch antenna) receives the modulated signal. This signal is demodulated, directly to baseband, using the Detector/Modulator 302, which, illustratively, could be a single Schottky diode. The diode should be appropriately biased with a current level so that the impedance of the diode matches the impedance of the Antenna 301 such that losses of the radio signal are minimized. The result of the diode detector is essentially a demodulation of the incoming signal directly to baseband. The Information Signal 200a is then amplified, by Amplifier 303, and synchronization recovered in Clock and Frame Recovery Circuit 304. The Clock Recovery Circuit 304 can be enhanced by having the Interrogator send the amplitude modulated signal using Manchester encoding. If large amounts of data are being transferred in frames, frame synchronization may be implemented, for example, by detecting a predetermined bit pattern that indicates the start of a frame. The bit pattern may be detected by clock recovery circuit (304) or processor (305). Bit pattern detection is well known in the art. The resulting information is sent to a Processor 305. The Processor 305 is typically an inexpensive 4- or 8-bit microprocessor and its associated memory; the Clock Recovery Circuit 304 can be implemented in an ASIC (Applied Specific Integrated Circuit) which works together with Processor 305. This Processor 305 can also serve as the driver for an optional Display Unit 309 should this Tag require a display. The Processor 305 generates an Information Signal 306 based on the particular program being executed by processor 305. Signal 306 is eventually communicated from the Tag 105 back to the Interrogator (e.g., 103). This Information Signal 306 is sent to a Modulator Control Circuit 307, which uses the Information Signal 306 to modulate a subcarrier frequency generated by the subcarrier Frequency Source 308. The Frequency Source 308 could be a crystal oscillator separate from the Processor 305, or it could be a frequency source derived from signals present inside the Processor 305—such as a divisor of the primary clock frequency of the Processor. The Modulated Subcarrier Signal 311 is used by Detector/Modulator 302 to modulate the modulated signal received from Tag 105 to produce a modulated backscatter (e.g., reflected) signal. This is accomplished by switching on and off the Schottky diode using the Modulated Subcarrier Signal 311, thereby changing the reflectance of Antenna 301. A Battery 310 or other power supply provides power to the circuitry of Tag 105. Power may also be received, for example, by using inductive coupling on microwaves.

Modulation

There are a variety of techniques for using MBS to send information from the Tag to the Interrogator. In some MBS technologies, the Modulator Control Circuit 307 of the Tag generates an amplitude modulated signal modulated at an Information Signal 306 frequency $f_2$. If the Radio Signal Source 201 generates a CW frequency $f_c$, then the Interrogator receives signals at $f_c$ whose bandwidth is $2f_2$ and filters signals outside of this bandwidth range. This approach could be termed the "MBS at baseband" approach.

Figure 3:
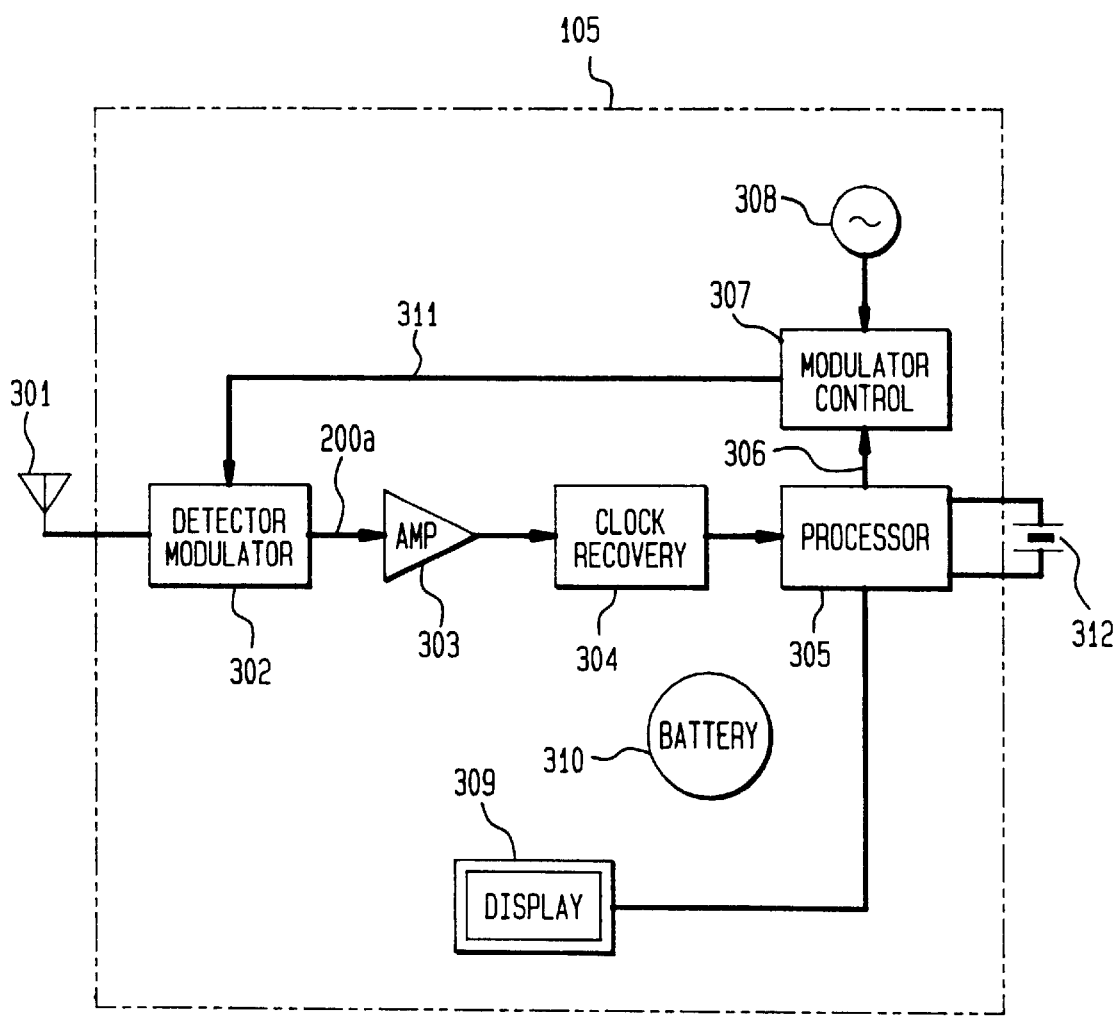
FIG. 3 shows a block diagram of a Tag Unit used in the RFID system of FIG. 1.

Another approach would be for the Tag to generate a subcarrier frequency $f_s$, generated by Frequency Source 308, as shown in FIG. 3. The information could be conveyed using AM, FSK or Phase Shift Keying (PSK) by modulating the subcarrier with a frequency of $f_s$ with the Information Signal having a primary frequency $f_2$ 306. The Interrogator receives signals at $f_c$ whose bandwidth is $2f_2$ but at a frequency $f_s$ away from $f_c$. This method is termed "MBS of a subcarrier".

In a Binary PSK (BPSK) system the phase of the subcarrier transitions nominally between 0 and 180 degrees. We disclose here specific techniques to apply Quadrature PSK (QPSK) to MBS systems. Based upon this disclosure, general levels of phase modulation are possible (such as MPSK), or other complex modulation schemes such as Differentially-encoded BPSK (DBPSK) or Differentially-encoded QPSK (DQPSK).

Figure 4:
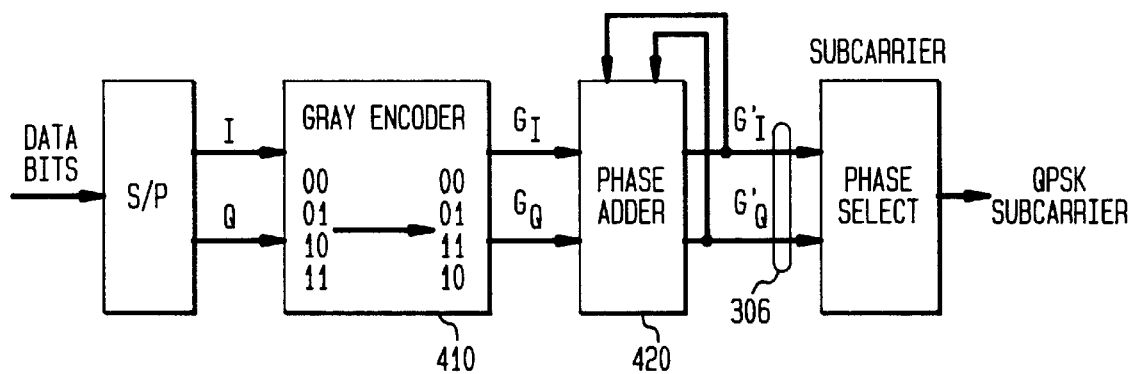
FIG. 4 shows a block diagram of a Differential Quadrature Phase Shift Keying (DQPSK) baseband encoder process.

When the Tag detects the presence of the Interrogator downlink signal it responds by transmitting its RFID data. In one embodiment, the Tag differentially encodes the uplink data and uses the differentially encoded data to QPSK modulate the subcarrier. The QPSK modulated a subcarrier 311 modulates the reflected CW signal, which has a frequency $f_c$ by changing the reflectance of antenna 301 using signal 311. FIG. 4 shows the baseband encoding algorithm for DQPSK. The data bits, at rate $f_2$ (for example, 100 k bit/sec, are taken two at a time, Gray encoded, and then the Gray encoded bits $G_I$ and $G_Q$ are added to the previous phase of the QPSK modulated signal; the result is the present phase of the baseband DQPSK signal. Gray encoder 410 does a simple conversion in accordance with the following: IQ=00→$G_IG_Q$=00; IQ=01→$G_IG_Q$=01; IQ=10→$G_IG_Q$=11; IQ=11→$G_IG_Q$=10. The outputs, $G_IG_Q$ of Gray encoder 410 are provided to phase adder 420. Phase adder 420 simply does a module 2 addition of $G_IG_Q$ and the present value of $G_IG_Q$ to produce the new value of $G_IG_Q$. For example if $G_IG_Q$=11 and the present value of $G_IG_Q$=01 the new value of $G_IG_Q$=00. The information signal (306) is used to modulate the subcarrier which has a frequency $f_s$ (for example 250 kHz); the Modulated Subcarrier Signal 311 is used to control the reflectivity of the Detector Modulator 302 thereby sending a CW signal (having frequency $f_c$) that has been modulated by the DQPSK modulated subcarrier back to the Interrogator. For QPSK systems the Interrogator receives signals at $f_c$ whose bandwidth is $f_2$ but at a frequency $f_s$ away from $f_c$.

There are at least two ways in which to modulate the subcarrier 311. The first method derives the subcarrier from the microprocessor crystal circuit (312) and is generated internally by the microprocessor 305. Here the DQPSK data is stored as a phase "word" inside the microprocessor memory. During uplink transmission the word representing the current data bit is written to an external Port to produce 306 which controls the backscattering modulator 307. The word is shifted out the Port at twice the subcarrier frequency rate thereby producing the desired subcarrier frequency $f_s$. For example, to get a square wave of frequency $f_s$, an alternating 1,0 pattern is written to the port at a rate of $2f_s$. The number of cycles in which the word is shifted out of the Port produces the desired channel symbol rate of the DQPSK modulated uplink signal. (This is half the channel symbol rate of BPSK and resulting in the channel bandwidth $f_2$ described above.)

Figure 5:
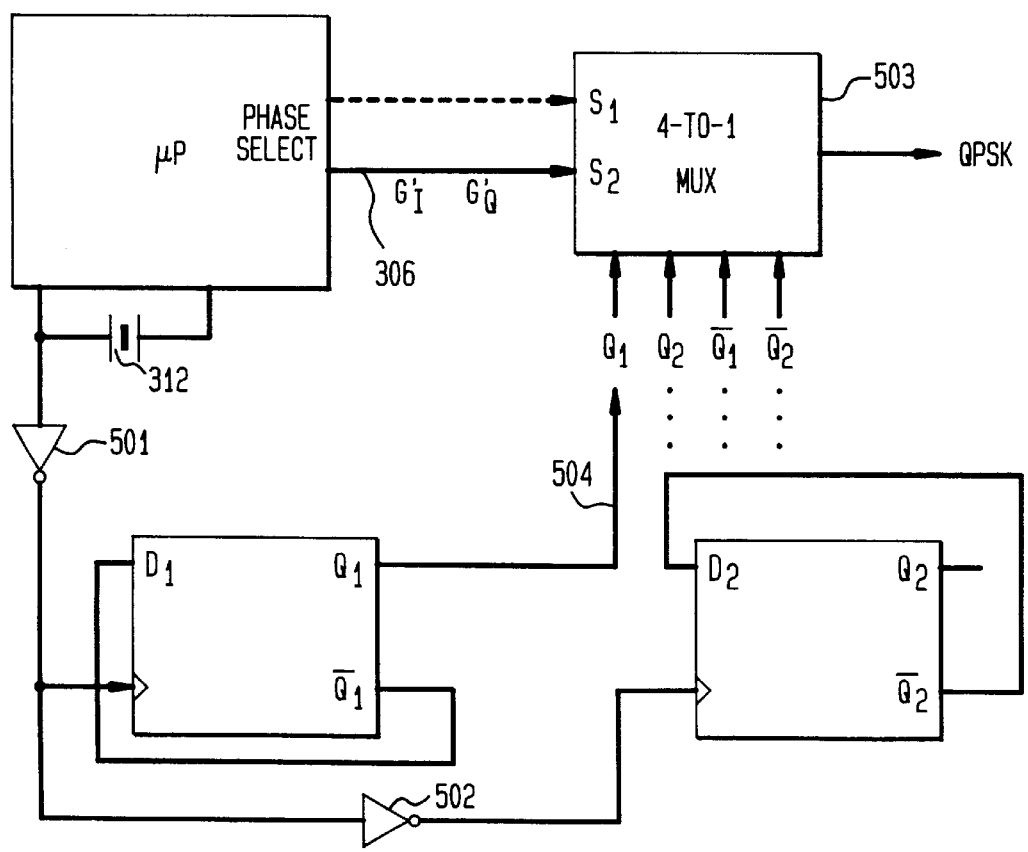
FIG. 5 shows a logic diagram of an illustrative external MBS subcarrier modulation circuit.
Figure 6:
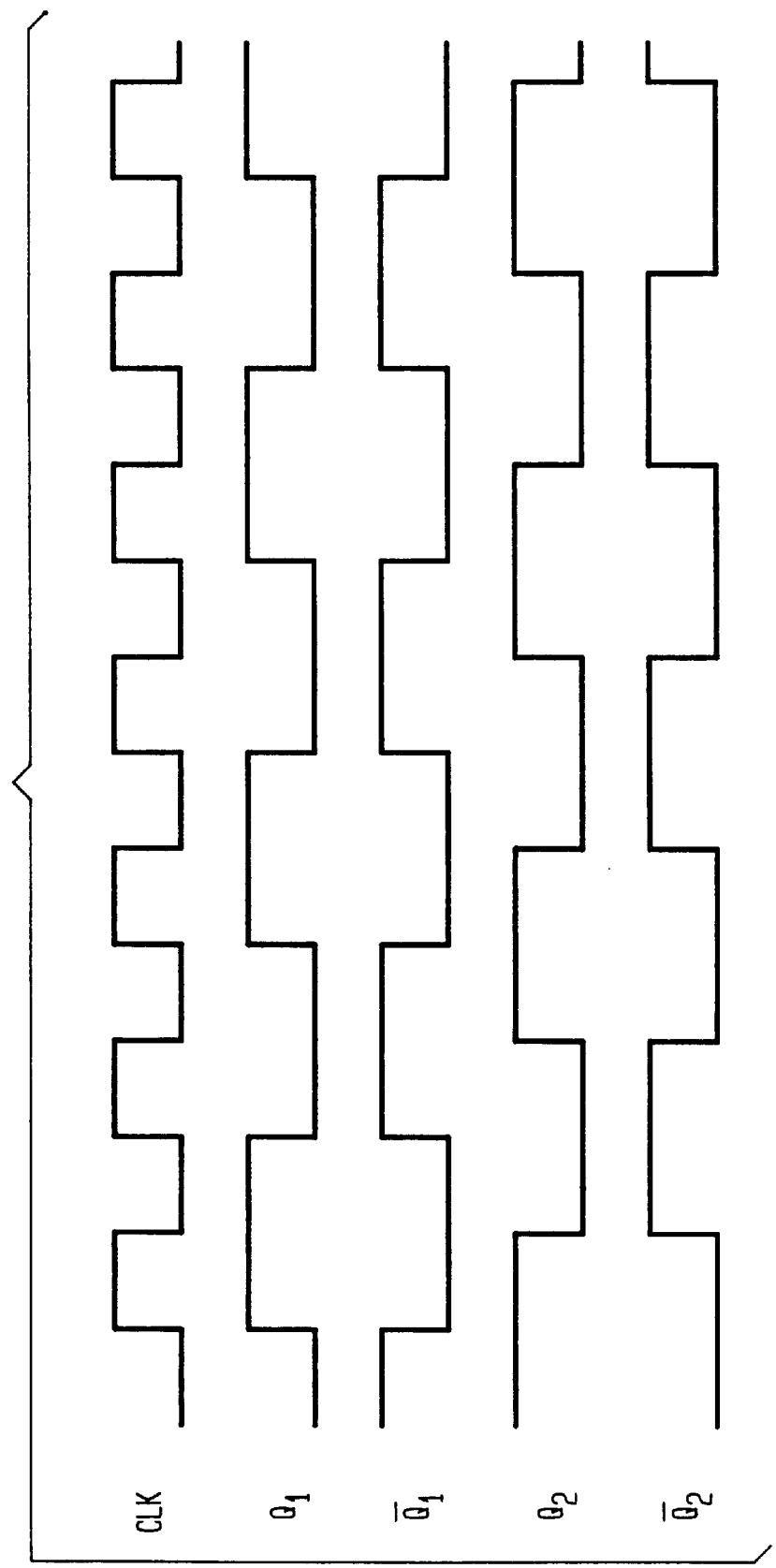
FIG. 6 illustrates the four phases of the sub-carrier.

The second method for generating the modulated uplink is to generate the subcarrier frequency external to the microprocessor 305. In one embodiment, FIG. 5, a 4-to-1 multiplexor 503 is used as the QPSK modulator control 307. The multiplexor selects the phase of the subcarrier 311 by the current value of $G_I$ and $G_Q$, written to the select lines of the multiplexor from the processor port as signal 306. The subcarrier signal can be generated from the microprocessor's external crystal or clock circuit 312 by connecting a buffer circuit 501 and a digital clock divider circuit 502 (if necessary) to the microprocessor's clock circuit 312. The two O-flip-flops comprising clock divider circuit 502 produce the 4 phase shifts of the subcarrier signal 504 and multiplexor 503 selects one of the 4 phases based on the signals $G_I$ and $G_Q$ which are presented at multiplexor 503's select inputs. FIG. 6 illustrates the relationship between the output of buffer 501 and the outputs of the two O-flip-flops. The subcarrier signal 504 is phase modulated by the multiplexor circuit 503; thereby producing the second information signal.

The methods described above for either internally or externally generating the modulated subcarrier signal 311 are extendible to M-ary Phase Shift Keyed modulation. For example, DMPSK requires that the data bits be Gray encoded M bits at a time and the digital clock divider will need additional stages to produce the M phase shifts of the subcarrier signal; an M-to-1 multiplexor is used as the modulator controller 307.

Receiver

Returning to FIG. 2, the Interrogator 103 receives the reflected and modulated signal with the Receive Antenna 206, amplifies the signal with a Low Noise Amplifier 207, and demodulates the signal using homodyne detection in a Mixer 208 down to the Intermediate Frequency (IF) of the single subcarrier $f_s$. (In some Interrogator designs, a single Transmitter 204 and Receive 206 Antenna is used. In this event, an electronic method of separating the transmitted signal from that received by the receiver chain is needed; this could be accomplished by a device such as a Circulator.) Using the same Radio Signal Source 201 as used in the transmit chain means the demodulation to IF is done using Homodyne detection; this has advantages in that it greatly reduces phase noise in the receiver circuits. The Mixer 208 then sends a Demodulated Signal 209—if using a Quadrature Mixer, it sends both I (in phase) and Q (quadrature) signals—into Filter/Amplifier 210 to filter the Demodulated Signal 209. The resulting filtered signal—then typically an Information Signal 211 carried on an IF subcarrier—is then demodulated from the subcarrier in the Subcarrier Demodulator 212, which then sends the Information Signal 213 to Processor 200 to determine the content of the message. The I and Q channels of Signal 209 can be combined in the Filter/Amplifier 210, or in the Subcarrier Demodulator 212, or they could be combined in the Processor 200.

The are several choices for implementing the data recovery 212 part of the receiver hardware: conventional analog I/Q demodulation of the subcarrier signal using, e.g., a Costas Loop, Digital Signal Processing (DSP) of the sampled subcarrier, or implementing a receiver in digital logic. Since minimizing the system cost is one objective, one embodiment of this invention has been implemented in digital logic.

Figure 7:
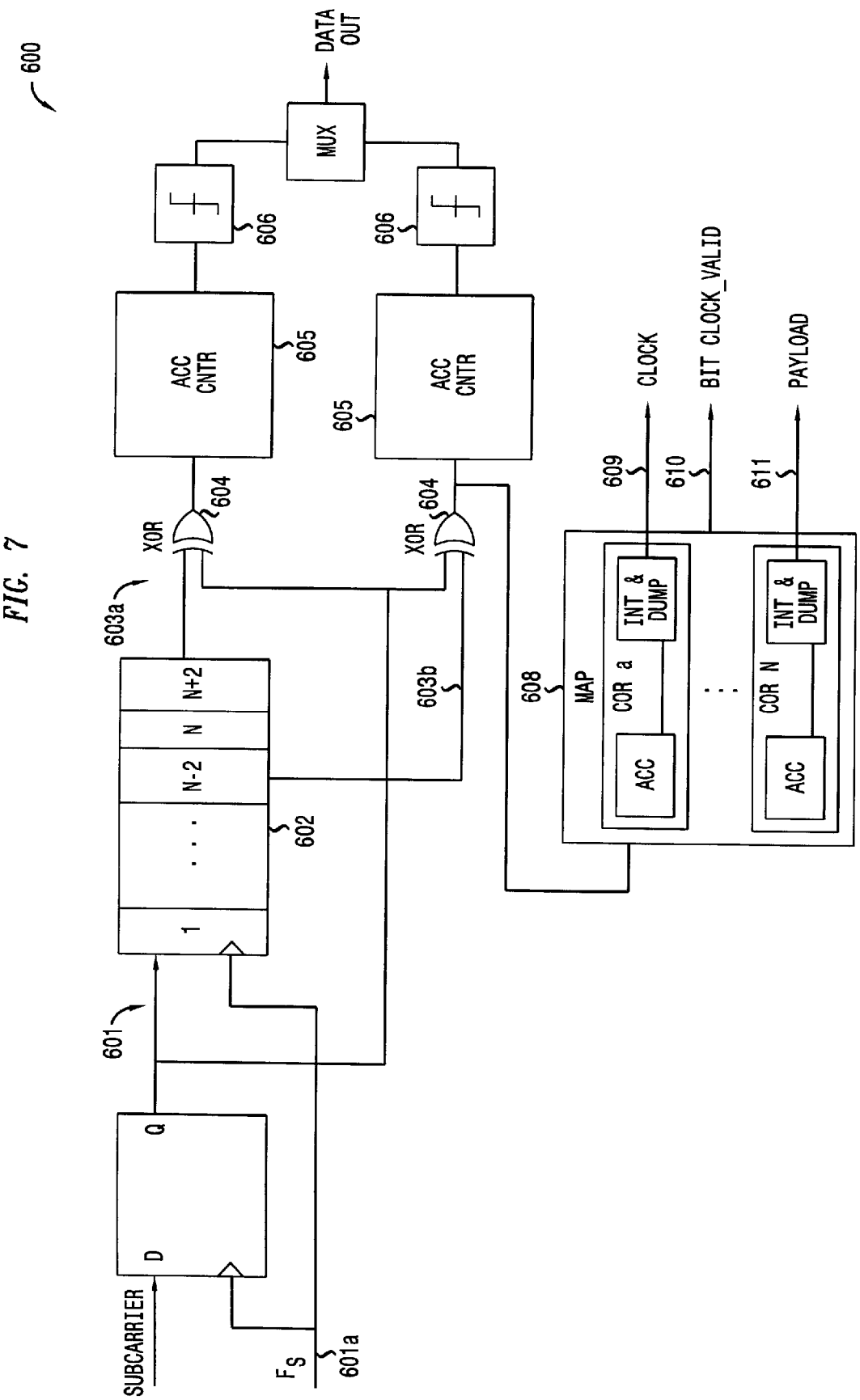
FIG. 7 shows a logic diagram of a Gate Array DQPSK receiver.

The data recovery circuit 212 is implemented in Gate Array circuit, FIG. 7. It has two functions:
1) demodulation of the differentially encoded phase shift keyed data (data recovery circuit), and
2) deriving the received bit clock for the demodulated data stream (clock recovery circuit).

The input to the data recovery circuit 212 is the hard limited subcarrier 601, which is modulated by differential QPSK. The subcarrier 601 is sampled at frequency rate $F_s$ (for example, 4 MHz) 601a, and is input to a N+2 stage shift register 602 (in this example, N=80), the $N^{th}$ stage providing a one symbol delay 603 (the shift register 602 is also clocked at the sampling rate $F_s$). The N+2 stage is designed to advance the Quadrature modulated subcarrier signal by 45° 603a and the N−2 stage 603b is at −45° relative to the subcarrier 601. The sampled subcarrier 601 is essentially multiplied with each of the delayed subcarriers 603a and 603b (using exclusive-OR gates) 604 and the results are filtered by accumulator circuits 605, which are the digital equivalent to the classic integrate and dump (Matched Filter) receiver, which integrates over one symbol period (in the example, one symbol period is N periods of shift register 602's clock, where N=80 and $F_s$=4 MHz). The output of the accumulators are passed to symbol decision comparators 606 and the resulting decision symbols are the I and Q information symbols bits, which are multiplexed (interleaved) to produce the demodulated data stream 607. With regard to symbol decision comparators 606, if the output of the accumulator is greater than or equal to N/2 (in this example, N/2=40) comparator 606 outputs a 1, and if the output of the accumulator is less than N/2, comparator 606 outputs a 0.

After information bit demodulation, the data clock is be generated. The demodulator implements a Maximum A Posteriori (MAP) bit timing circuit. The demodulated data is sent to a bank of correlators 608, each of which is testing a different clock phase. The correlators measure the alignment of the input data with their clock over a B data bit window. The B bit window is 8 data bits long in this example; however, larger values of B are less sensitive to long strings of 1's or 0's, but require more hardware (or software/time) to implement. Each correlator is made from an integrate-and-dump filter, a weighting function that gives higher weight to high signal-to-noise data, and an accumulator (that accumulates over a period of B). A weighting function is not required, but it is possible to give higher weight to higher correlator outputs and lower weights to low correlator outputs. For example, correlator outputs approaching +1 or −1 are multiplied by a factor of 10, and correlator outputs approaching 0 are given a value equal to the square root of the actual output. After B bits have been examined, the correlator with the highest accumulator value is found and its associated clock phase 609 is used to sample the next B bits of data. The accumulator is then reset, and the next B bits are examined. The important thing here is that there is no memory from one set of bits to the next; every B bits the clock estimation circuit generate a new estimate of the best clock phase that does not depend on previous estimates. This lets us acquire a bit clock quickly—providing a bit clock even for modest SNR. Prior art maintains that a Phase Locked Loop (either analog or digital) be used in clock recovery. However, Phase Locked Loops have a minimum "lock-up" time that is a function of the loop filter. This lock-up time also increases as system noise increases and are unreliable for modest SNR.

There are a few other functions that may be incorporated in the Gate Array chip; for example, the largest correlator value is checked to see if it is higher than a fixed threshold. If it is, a signal is generated indicating that the bit clock is valid 610. The framing scheme uses a Barker code to indicate the start of the payload data. The presence of the Barker word is detected and generates a signal that indicates that the next bit is part of the payload 611.

The methods described above demodulating the sampled subcarrier signal 601 are extendible to M-ary Phase Shift Keyed modulation. For example, DMPSK requires additional shift register delay stages to produce the M phase shifts of the sampled modulated subcarrier signal and the additional XOR, accumulator and decision circuits to decode the M parallel bit paths.

The methods can also be extended to more sophisticated phase modulation schemes such as MSK (Minimum Shift Keyed), GMSK (Gaussian Minumum Shift Keyed), etc. For MSK, pre-computed phase transitions could be stored in the processor's memory. Also, for example, through computation in the processor, the Tag can generate a smooth transition from one phase to another, and thereby produce an appropriately filtered phase modulation to produce a GMSK-modulated subcarrier. Other phase modulation schemes are also possible.

Using the above techniques as an example, an inexpensive, short-range, bi-directional digital radio communications channel is implemented. These techniques are inexpensive as the Tag components consist of (for example) a Schottky diode, an amplifier to boost the signal strength, bit and frame synchronization circuits, an inexpensive 4 or 8 bit microprocessor, subcarrier generation circuits, and a battery. Most of these items are already manufactured in large quantities for other applications, and thus are not overly expensive. The circuits mentioned above for subcarrier generation may also be implemented in logic surrounding the microprocessor core; thus, except for a relatively small amount of chip real estate, these functions come almost "for free."

What has been described is merely illustrative of the application of the principles of the present invention. Other arrangements and methods can be implemented by those skilled in the art without departing from the spirit and scope of the present invention.

What is claimed is:

1. A modulated backscatter interrogator, comprising:
   a transmitter that transmits a first transmitted signal;
   a receiver that receives a reflected first transmitted signal;
   a demodulator that obtains a received PSK modulated subcarrier signal from the reflected first transmitted signal;
   a subcarrier demodulator that obtains an information signal from the received PSK modulated subcarrier signal, wherein the subcarrier demodulator includes:
      a shift register that receives a signal representative of the received PSK modulated subcarrier signal,
      at least one exclusive-or device that performs an exclusive-or function on signals from at least two different outputs of the shift register; and
      a plurality of correlators each having an accumulate circuit and an integrate and dump circuit that receives an input from the exclusive-or device, each of the correlators testing a different clock phase in order to estimate which of the different clock phases is closest to a clock phase for a set of bits.

2. The modulated backscatter system of claim 1, wherein the PSK modulated subcarrier and the received PSK modulated subcarrier signals are QPSK signals.

3. The modulated backscatter system of claim 1, wherein the PSK modulated subcarrier and the received PSK modulated subcarrier signals are DQPSK signals.

4. The modulated backscatter system of claim 1, wherein the PSK modulated subcarrier and the received PSK modulated subcarrier signals are MPSK signals.

5. A modulated backscatter interrogator, comprising:
   a transmitter that transmits a first transmitted signal;
   a receiver that receives a reflected first transmitted signal;
   a demodulator that obtains a received PSK modulated subcarrier signal from the reflected first transmitted signal;
   a subcarrier demodulator that obtains an information signal from the received PSK modulated subcarrier signal, wherein the subcarrier demodulator includes:
      a shift register that receives a signal representative of the received PSK modulated subcarrier signal,
      at least one exclusive-or device that performs an exclusive-or function on signals from at least two different outputs of the shift register; and
      a data clock recovery circuit that receives an input from the exclusive-or device.

6. The modulated backscatter interrogator of claim 5, wherein the data clock recovery circuit comprises a phase lock loop circuit.

7. The modulated backscatter interrogator of claim 5, wherein the data clock recovery circuit comprises at least one correlator having an accumulate circuit and an integrate and dump circuit that receives an input from the exclusive-or device.

8. The modulated backscatter system of claim 5, wherein the PSK modulated subcarrier and the received PSK modulated subcarrier signals are QPSK signals.

9. The modulated backscatter system of claim 5, wherein the PSK modulated subcarrier and the received PSK modulated subcarrier signals are DQPSK signals.

10. The modulated backscatter system of claim 5, wherein the PSK modulated subcarrier and the received PSK modulated subcarrier signals are MPSK signals.

* * * * *